United States Patent [19]

Fleury et al.

[11] Patent Number: 4,986,733
[45] Date of Patent: Jan. 22, 1991

[54] TURBOCHARGER COMPRESSOR WHEEL ASSEMBLY WITH BORELESS HUB COMPRESSOR WHEEL

[75] Inventors: Jean-Luc P. Fleury, Manhattan Beach; Jerome W. Thompson, Cypress; Voytek Kanigowski, Garden Grove, all of Calif.

[73] Assignee: Allied-Signal, Inc., Morris County, N.J.

[21] Appl. No.: 428,927

[22] Filed: Oct. 30, 1989

[51] Int. Cl.[5] .............................................. F04D 29/08
[52] U.S. Cl. ................................. 415/230; 415/172.1; 415/200; 416/204 A; 403/361; 417/407
[58] Field of Search ....... 416/204 R, 204 A, 244 RA; 415/170.1, 172.1, 203, 206, 230, 915, 200, 229, 104, 107; 403/296, 340, 343, 361; 417/424.2, 423.13, 405, 406, 407

[56] References Cited

U.S. PATENT DOCUMENTS

| | | | |
|---|---|---|---|
| 2,649,050 | 8/1953 | Dibdin | 415/171.1 |
| 3,961,867 | 6/1976 | Woollenweber | 417/407 |
| 4,128,283 | 12/1978 | Palmer | 417/407 |
| 4,340,317 | 7/1982 | Heitmann et al. | 403/25 |
| 4,613,281 | 9/1986 | Lubieniecki | 415/171.1 |
| 4,705,463 | 11/1987 | Joco | 417/407 |
| 4,850,820 | 7/1989 | Gutknecht | 417/407 |

Primary Examiner—John T. Kwon
Attorney, Agent, or Firm—Kelly Bauersfeld & Lowry

[57] ABSTRACT

An improved compressor wheel assembly for a turbocharger or the like includes a centrifugal compressor wheel having a boreless hub to substantially improve wheel fatigue life. The compressor wheel is formed as by casting to include an integral and internally threaded mounting sleeve extending coaxially from the boreless hub. In the assembly, the mounting sleeve extends through an opening in a compressor backplate for threaded connection to a turbocharger shaft, with a thrust collar spacer being interposed between axially facing shoulders defined respectively on the mounting sleeve and shaft to ensure accurate axial positioning of the components. An annular seal flange on the thrust collar spacer extends axially into the backplate opening in generally concentric spaced relation about the mounting sleeve. This seal flange is adapted to carry one or more seal rings for engaging the backplate, thereby sealing the passage of the mounting sleeve and shaft through the backplate opening.

18 Claims, 2 Drawing Sheets

TURBOCHARGER COMPRESSOR WHEEL ASSEMBLY WITH BORELESS HUB COMPRESSOR WHEEL

BACKGROUND OF THE INVENTION

This invention relates generally to improvements in turbocharger compressor wheels and the like, and related compressor wheel assemblies designed for extended wheel fatigue life. More particularly, this invention relates to an improved centrifugal compressor wheel of the boreless hub type, wherein the compressor wheel is adapted for simplified assembly in a turbocharger or the like.

Centrifugal compressor wheels in general are well known in the art for use in turbochargers and the like, wherein the compressor wheel comprises an aerodynamically contoured array of impeller blades supported on a central wheel hub section which is mounted in turn onto a rotatable shaft for rotation therewith. In the context of a turbocharger, by way of example, the wheel hub section conventionally includes a central axial bore through which the shaft extends, and a threaded nut is fastened over the shaft at a nose end of the compressor wheel to hold the hub section tightly against a shaft shoulder or other diametrically enlarged structure rotatable with the shaft. The rotatable shaft thereby drives the compressor wheel in a direction such that the contoured blades axially draw in air for discharge radially outwardly at an elevated pressure into a volute-shaped chamber of a compressor housing. The pressurized air is then supplied from the housing to the air intake manifold of a combustion engine for mixture and combustion with fuel, all in a well-known manner.

In recent years, improvements in compressor technology and design have resulted in progressive increases in compressor efficiencies and flow ranges, together with more rapid transient response characteristics. For example, compressor wheels for turbochargers are known wherein the contoured impeller blades exhibit compound and highly complex curvatures designed for optimum operational efficiency and flow range. Such complex blade shape is most advantageously and economically obtained by a casting process wherein the wheel hub section and blades are integrally formed desirably from a lightweight material, such as aluminum or aluminum alloy, chosen for its relatively low rotational inertia consistent with rapid wheel accelerations and decelerations during transient engine operating conditions.

Cast compressor wheels of this general type, however, have exhibited a relatively short, finite fatigue life resulting in undesired occurrences of wheel fatigue failure during operation. More specifically, when the compressor wheel is rotated at very high speeds, the cast aluminum material is subjected to relatively high centrifugal loading in a tangential direction particularly near the center, wherein the hub region of the compressor wheel must support the rapidly rotating wheel mass by the action of radial and tangential stresses. The impact of these stresses is especially severe when the compressor wheel is operated at a relatively high speed, rapid speed cycle environment as encountered, for example, in many modern turbocharger applications. Unfortunately, as previously described, the hub region of the compressor wheel normally includes a major void in the form of the central bore for receiving the rotatable shaft, wherein this central bore acts as a major stress riser rendering the wheel highly susceptible to fatigue failure in the hub region. This fatigue problem is compounded by the presence of any metallurgical imperfections, such as dross, voids, and/or inclusions which occur inherently during the casting process and tend to congregate in the hub region of the compressor wheel.

Improvements in cast compressor wheels have been proposed in the form of a compressor wheel having a boreless hub section to eliminate the stress riser site provided by the conventional shaft bore. While such alternative wheel designs theoretically provide extended fatigue life, a variety of significant design problems have been encountered.

For example, such boreless hub compressor wheels normally include an internally threaded sleeve extending coaxially from the boreless hub for attachment to the threaded end of a rotatable shaft. This threaded sleeve is formed to avoid any internal bore within the centrifugal compressor wheel along the axial span between the nose end and a plane corresponding with the maximum diameter of the wheel. To avoid undesired axial extension of the turbocharger or the like, the threaded sleeve is fitted through an adjacent opening in a compressor backplate for direct attachment to the rotatable shaft, with one or more seal rings being carried about the sleeve for sealing engagement with the backplate. However, assembly of the various components, including threaded attachment of the sleeve to the shaft while seating one or more seal rings within the backplate opening, can be extremely difficult. Moreover, when the threaded sleeve is cast integrally with the compressor wheel from the same lightweight material, the sleeve possesses inadequate structural hardness to support the seal ring or rings without undue wear. Alternative designs have envisioned welded attachment of a separate sleeve formed from a suitable hard bearing material onto a boreless hub wheel, as disclosed in U.S. Pat. No. 4,705,463, but this concept encounters significant balancing problems and undesirably introduces new stress riser zones within the hub as a result of exposure to welding heat.

There exists, therefore, a significant need for further improvements in turbocharger compressor wheels and related wheel assemblies of the boreless hub type, wherein a boreless hub compressor wheel is adapted for facilitated assembly with a turbocharger shaft in combination with sealed passage through a compressor backplate opening. The present invention fulfills these needs and provides further related advantages.

SUMMARY OF THE INVENTION

In accordance with the invention, an improved compressor wheel assembly is provided for use in a turbocharger or the like, wherein the assembly includes a centrifugal compressor wheel of the type having a boreless hub. The compressor wheel includes an integrally cast and internally threaded mounting sleeve extending coaxially from the boreless hub and adapted for threaded attachment to a rotatable shaft of a turbocharger or the like. The mounting sleeve and shaft are assembled with a thrust collar spacer which includes means for sealing passage of the mounting sleeve through a compressor backplate opening.

In accordance with the preferred form of the invention, the compressor wheel is formed by casting from an aluminum or selected aluminum alloy material to define a boreless hub in combination with an array of aerodynamically contoured impeller blades which extend generally between a circular wheel back disk of relatively large diameter and a small diameter wheel nose. The mounting sleeve is integrally cast with the compressor wheel and extends coaxially from the hub in a direction opposite the wheel nose. The mounting sleeve forms an internal bore defined by a shallow smooth-walled cylindrical entrance zone leading to an internally threaded region.

The compressor wheel is mounted quickly and easily onto a threaded end of a rotatable turbocharger shaft or the like by threaded connection of the shaft end into the threaded region of the mounting sleeve. Such connection draws a cylindrical land on the shaft into press-fit seated relation within the shallow cylindrical entrance zone of the mounting sleeve. A thrust collar spacer is interposed between axially facing shoulders defined respectively by the end of the mounting sleeve and a radially enlarged shoulder formed on the rotatable shaft. The thrust collar spacer fixes the axial positions of the shaft and compressor wheel with respect to a turbocharger housing, as is known in the art.

The thrust collar spacer includes a generally annular and axially elongated seal flange which extends axially toward the compressor wheel in concentrically spaced relation about the mounting sleeve. This seal flange is formed from a selected bearing material or the like of suitable hardness and extends axially into the opening in a compressor backplate. At least one seal ring is carried within an outwardly open groove in the seal flange to contact the backplate within the opening, thereby sealing passage of the mounting sleeve therethrough.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
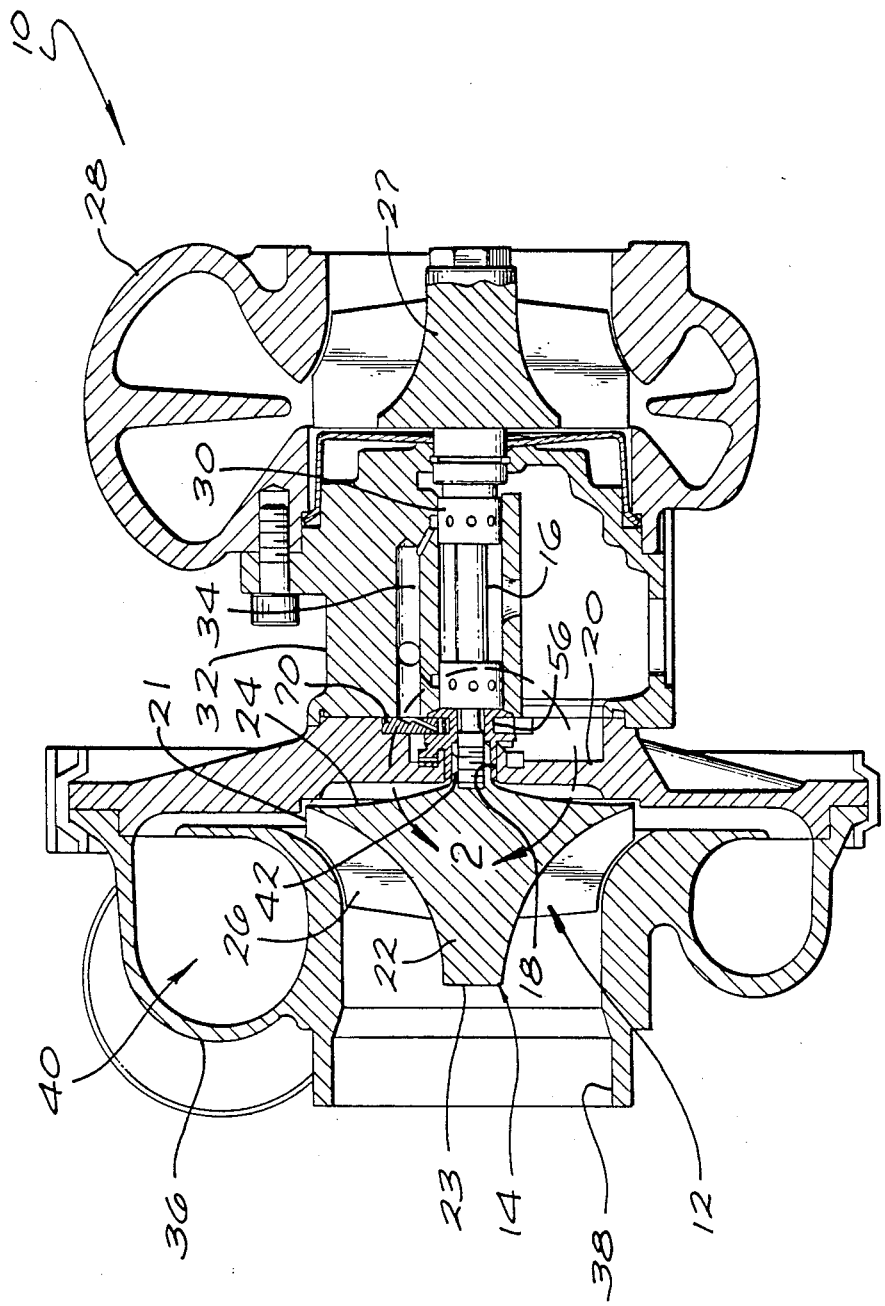
FIG. 1 is a sectional view of a turbocharger including a compressor wheel assembly embodying the novel features of the invention.

As shown in the exemplary drawings, a turbocharger or the like referred to generally in FIG. 1 by the reference numeral 10 includes an improved compressor wheel assembly 12 of the type having a boreless hub compressor wheel 14. The compressor wheel assembly 12 is adapted for quick and easy assembly of the compressor wheel 14 onto a rotatable turbocharger shaft 16, with improved sealing means for sealing passage of the wheel connection structures extending through an opening 18 in a compressor backplate 20.

The improved compressor wheel assembly 12 of the present invention beneficially uses a compressor wheel 14 of the boreless hub type, to achieve significant improvements in wheel rotational speed range and extended fatigue life during normal operation, for example, in a modern turbocharger environment. In this regard, the compressor wheel 14 comprises a centrifugal compressor wheel of the type having a central hub 22 extending along a rotational axis between a relatively small diameter nose 23 at one end to a significantly larger wheel or tip diameter 21 at an opposite end. A back disk 24 is defined as a circular surface at the larger diameter end of the wheel 14, facing axially away from the nose 23, wherein the back disk 24 may be contoured to extend axially from the plane of maximum wheel diameter as shown in the accompanying drawings. The central hub 22 of the compressor wheel 14 supports an array of aerodynamically contoured impeller vanes 26 which sweep smoothly with complex curvatures between the nose 23 and the tip diameter 21.

The compressor wheel 14 is formed preferably by casting from a relatively lightweight, relatively low inertia material such as aluminum or a selected aluminum alloy. Importantly, as clearly shown in FIG. 1, the hub 22 of the compressor wheel 14 is boreless in that there are no internal voids in the region extending axially between the nose 23 and the plane of largest wheel diameter adjacent the back disk 24. As is known in the art, the use of a boreless type compressor wheel avoids formation of a conventional central bore for passage of the turbocharger shaft 16, wherein such central bore undesirably defines a stress riser which effectively restricts maximum rotational speed of the compressor wheel and/or contributes to a shortened wheel fatigue life especially in a rapid speed cycle environment. See, for example, U.S. Pat. No. 4,705,463 which is incorporated by reference herein. In accordance with the invention, the boreless hub wheel 14 is configured for facilitated manufacture and relatively simple balancing for high speed rotation, and is further adapted for relatively easy assembly into in a compact turbocharger envelope having effective means for sealing component passage through a compressor backplate.

The illustrative compressor wheel assembly 12 is shown within a turbocharger 10 of generally conventional overall geometry and operation. In particular, by way of brief explanation and as viewed in FIG. 1, the turbocharger 10 includes a turbine wheel 27 mounted within a turbine housing 28 adapted for flow-through passage of exhaust gases from an engine (not shown). The exhaust gases rotatably drive the turbine wheel 27 for correspondingly rotating the turbocharger shaft 16 supported by suitable bearings 30 within a so-called center housing 32. Lubrication ports 34 and related flow passages in the center housing 32 circulate lubricating oil to the bearings 30, with the oil flow and bearing design accommodating relatively high speed shaft rotation. The turbocharger shaft 16 is connected in turn to the compressor wheel 14 to rotatably drive the compressor wheel within a compressor housing 36. During such wheel rotation, the compressor wheel assembly 12 draws in ambient air through an axial intake 38 and discharges the air radially into a volute chamber 40 at elevated pressure. Such pressurized air is supplied in turn from the compressor housing 36 to the intake manifold or the like of a combustion engine for a mixture with and combustion with fuel. This provision of pressurized air to the engine results in a substantial increase in mass flow through the engine to correspondingly permit engine operation at increased performance levels.

Figure 2:
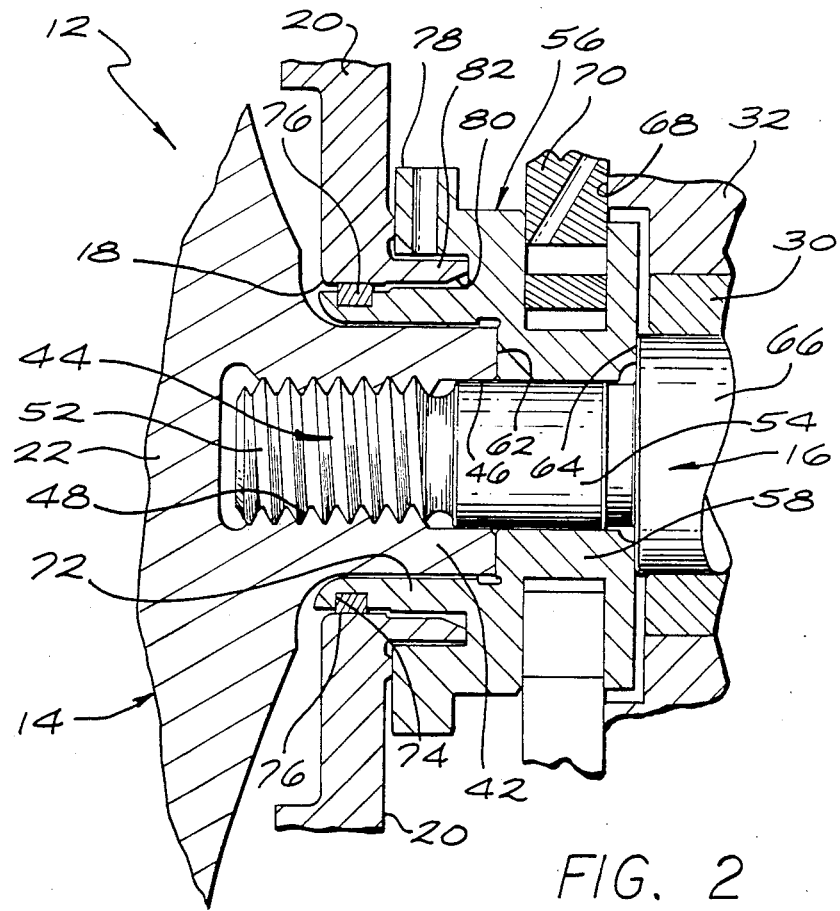
FIG. 2 is an enlarged fragmented sectional view corresponding generally with the encircled region 2 of FIG. 1.

As shown best in FIG. 2, the boreless hub compressor wheel 14 includes a mounting sleeve 42 adapted for threaded connection to the adjacent end of the turbocharger shaft 16. This mounting sleeve 42 is formed integrally with the compressor wheel 14 as a one-piece or unitary casting, such that the wheel 14 and the sleeve 42 are formed from the same material and with significant precision balance relative to a rotational wheel axis. A central bore 44 is formed in the mounting sleeve 42 for receiving the end of the turbocharger shaft 16, as will be described in more detail. This sleeve bore 44 terminates in axially spaced relation to the plane of maximum wheel diameter to avoid intrusion into the wheel hub region. Accordingly, the compressor wheel has a boreless hub with the mounting sleeve extending coaxially from the back disk 24 in a direction opposite the wheel nose 23.

The central bore 44 of the wheel mounting sleeve 42 is specifically shaped for relatively precision coaxial attachment of the turbocharger shaft to the compressor wheel. More particularly, as shown in FIG. 2, the sleeve bore 44 is defined by shallow and smooth-walled entrance zone 46 which merges with an inset threaded region 48 within which internal threads are formed. The formation of these internal threads together with precision sizing of the entrance zone 46 is preferably performed by suitable machining subsequent to wheel casting. Moreover, the threaded region 48 desirably includes an optimum number of threads for obtaining a secure coaxial attachment to the shaft 16, with at least five threads being utilized in one working embodiment of the invention.

The end of the turbocharger shaft 16 includes a threaded section 52 having male threads thereon for mating thread-in attachment to the internal threads within the mounting sleeve 42. Importantly, the threaded section 52 is formed adjacent to a shaft land 54 of cylindrical shape having a diametric size to fit closely in press-fit relation into the smooth-walled entrance zone 46 of the mounting sleeve. The diametric size of the land 54 and the associated sleeve entrance zone 46 are at least slightly larger than the maximum diameter of the shaft threads.

Figure 3:
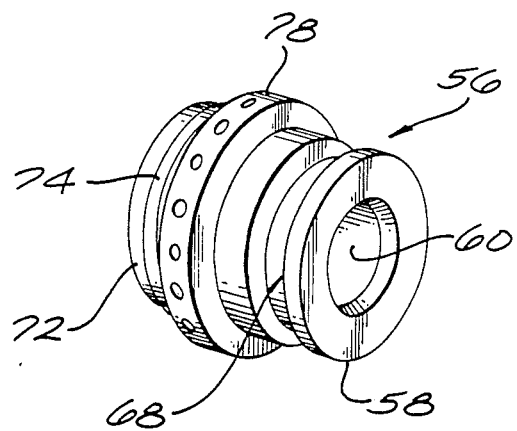
FIG. 3 is a perspective view illustrating a preferred geometry for a thrust collar spacer used in the compressor assembly of FIGS. 1 and 2.

The precise axial position of the compressor wheel 14 relative to the turbocharger shaft 16 is regulated by a thrust collar spacer 56 formed from a suitable bearing material or the like. As shown in FIGS. 2 and 3, this thrust collar spacer 56 comprises an annular collar segment 58 formed with a precision axial span and defining an inner bore 60 for close sliding reception onto the shaft land 54. The collar segment 58 seats between a pair of axially opposed shoulders 62 and 64 defined respectively on the end of the mounting sleeve 42 and a radially enlarged portion 66 of the turbocharger shaft 16. Accordingly, when the mounting sleeve 42 is threaded onto the shaft 16, the shaft land 54 enters the sleeve entrance zone 46 in press-fit relation. Threaded advancement of the sleeve 42 on the shaft 16 is continued, however, until the collar segment of the spacer 56 is seated axially between the opposed shoulders 62 and 64. This thrust collar spacer 56 in turn provides a radially outwardly open annular channel 68 for receiving a conventional thrust bearing 70 which is normally retained axially between the center housing 32 and the compressor backplate 20 for purposes of axially setting and retaining the rotatable components.

As shown in FIG. 2, the thrust bearing 70 positions the compressor wheel 14 with the mounting sleeve 42 protruding into the backplate opening 18. In this regard, in accordance with further aspects of the invention, the thrust collar spacer 56 includes an axially extending and generally annular seal flange 72 formed as an integral part of the spacer and shaped to extend into the backplate opening 18 in generally concentric spaced relation between the mounting sleeve 42 and the portion of the backplate defining the opening 18. At least one radially outwardly open groove 74 is formed near the outboard end of the seal flange 72 for receiving and supporting a standard seal ring 76 in sealing engagement with the backplate 20. Accordingly, leakage of lubricating oil within the center housing 32 through the backplate opening 18 is substantially prevented by the seal flange 72 and the seal ring 76. Any oil tending to flow toward the backplate opening 18 is conveniently urged to flow radially outwardly therefrom by means of an apertured slinger ring 78 which is also provided as part of the thrust collar spacer.

The various components described herein are beneficially designed for rapid assembly in the course of manufacture, without requiring tedious manipulation steps or close visual inspection. More particularly, the turbocharger 10 is normally assembled in part with the shaft 16 projecting upwardly from the turbine housing 28 which is suitably retained in a support fixture (not shown). The shaft 16 protrudes slightly through the compressor backplate 20 installed thereon, with the thrust collar spacer 56 previously seated about the shaft 16 in abutment with the shaft shoulder 64. Placement of the compressor backplate 20 onto the center housing 32 with the seal flange 72 projecting through the backplate opening 18 is facilitated by a chamfer 80 formed on a leading edge of an annular lip 82 lining the opening 18. The compressor wheel 14 can then be installed quickly and easily by threading the mounting sleeve 42 onto the shaft 16 within the seal flange 72. Conveniently, the direction of the sleeve and shaft threads is chosen for self-tightening during turbocharger operation.

A variety of modifications and improvements to the compressor wheel assembly of the present invention will be apparent to these skilled in the art. Accordingly, no limitation of the invention is intended by way of the foregoing discription and the accompanying drawings, except as set forth in the appended claims.

What is claimed is:

1. A compressor wheel assembly comprising:
a compressor backplate defining a backplate opening;
a rotatable shaft having a threaded end;
a centrifugal compressor wheel having a boreless hub supporting an array of impeller blades, and a mounting sleeve formed integrally with and extending coaxially from said hub, said mounting sleeve defining an internally threaded bore, said mounting sleeve extending into said backplate opening and having said shaft end threaded into said mounting sleeve bore, said mounting sleeve and said shaft respectively defining axially opposed first and second shoulders when said shaft end is threaded into said mounting sleeve bore;
a thrust collar spacer including a collar segment interposed axially between said first and second shoulders in abutting relation therewith when said shaft end is threaded into said mounting sleeve bore to axially position said compressor wheel relative to said shaft, said thrust collar spacer further including an annular seal flange extending axially into said backplate opening in generally concentric spaced relation between said mounting sleeve and said backplate within said backplate opening; and at least one seal ring carried by said seal flange in substantially sealing engagement between said seal flange and said backplate.

2. The compressor wheel assembly of claim 1 wherein said compressor wheel comprises a casting of an aluminum material.

3. The compressor wheel assembly of claim 1 wherein said shaft includes a generally cylindrical land interposed axially between said threaded end and said second shoulder, said land having a diametric size less than the diametric size of said second shoulder, and wherein said internal bore formed in said mounting sleeve includes a shallow and generally smooth-walled entrance zone leading to an inset threaded section, said entrance zone having a diametric size for relatively close sliding reception of at least a portion of said shaft land when said collar segment is in abutting relation with said first and second shoulders.

4. The compressor wheel assembly of claim 3 wherein said first shoulder is defined by an axial end of said mounting sleeve disposed opposite to said hub.

5. The compressor wheel assembly of claim 1 wherein said hub extends axially between a diametrically enlarged base disk at one axial end and a nose of reduced diameter at an opposite axial end.

6. The compressor wheel assembly of claim 1 wherein said seal flange is formed integrally with said collar segment of said thrust collar spacer.

7. The compressor wheel assembly of claim 1 wherein said backplate defines a chamfered edge surrounding said backplate opening at one axial side thereof for facilitated reception of said seal flange into said backplate opening.

8. The compressor wheel assembly of claim 1 in combination with a turbine wheel connected to the end of said shaft opposite said compressor wheel, said turbine and compressor wheels being rotatable with said shaft.

9. A compressor wheel assembly, comprising:
a compressor backplate defining a backplate opening;
a rotatable shaft having a first end;
a compressor wheel having a boreless hub supporting an array of impeller blades, and a mounting member formed integrally with and extending coaxially from said hub into said backplate opening;
said shaft first end and said mounting member including means for interconnecting said shaft first end to said mounting member in generally coaxial alignment;
spacer means for axially positioning said compressor wheel with respect to said shaft;
a seal flange rotatable with said shaft and disposed within said backplate opening in generally concentrically spaced relation between said mounting member and said backplate; and
at least one seal ring carried by said seal flange in sealing relation with said backplate.

10. The compressor wheel assembly of claim 9 wherein said seal flange is formed integrally with said spacer means.

11. The compressor wheel assembly of claim 9 wherein said mounting member and said shaft when interconnected respectively define axially opposed shoulders, said spacer means being axially interposed between said shoulders.

12. The compressor wheel assembly of claim 9 wherein said mounting member comprises an internally threaded mounting sleeve, and wherein said shaft first end comprises an externally threaded first end.

13. The compressor wheel assembly of claim 12 wherein said shaft further includes a generally cylindrical land formed adjacent said threaded first end, and wherein said mounting sleeve includes a shallow smooth-walled entrance zone for at least partial press-fit reception at said land when said mounting sleeve and shaft are interconnected.

14. The compressor wheel assembly of claim 9 wherein said backplate defines a chamfered edge surrounding said backplate opening at one axial side thereof for facilitated reception of said seal flange into said backplate opening.

15. The compressor wheel assembly of claim 9 wherein said compressor wheel comprises a casting of an aluminum material.

16. In combination with a turbocharger having a center housing, a shaft extending through said center housing, bearing means for rotatably supporting said shaft, and a turbine wheel mounted on one end of said shaft, an improved compressor wheel assembly, comprising:
a compressor backplate defining a backplate opening;
a rotatable shaft having a threaded end;
a centrifugal compressor wheel having a boreless hub supporting an array of impeller blades, and a mounting sleeve formed integrally with and extending coaxially from said hub, said mounting sleeve defining an internally threaded bore, said mounting sleeve extending into said backplate opening and having said shaft end threaded into said mounting sleeve bore, said mounting sleeve and said shaft respectively defining axially opposed first and second shoulders when said shaft end is threaded into said mounting sleeve bore;
a thrust collar spacer including a collar segment interposed axially between said first and second shoulders in abutting relation therewith when said shaft end is threaded into said mounting sleeve bore to axially position said compressor wheel relative to said shaft, said thrust collar spacer further including an annular seal flange extending axially into said backplate opening in generally concentric spaced relation between said mounting sleeve and said backplate within said backplate opening;
at least one seal ring carried by said seal flange in substantially sealed engagement with said backplate; and
a thrust bearing carried by said thrust collar spacer and axially retained between said center housing and said backplate for retaining said shaft in a predetermined axial position relative to said center housing.

17. A compressor wheel assembly comprising:
a rotatable shaft having a threaded end;
a centrifugal compressor wheel having a boreless hub supporting an array of impeller blades, and a mounting sleeve formed integrally with and extending coaxially from said hub, said mounting sleeve defining an internally threaded bore, said mounting sleeve having said shaft end threaded into said mounting sleeve bore, said mounting sleeve and said shaft respectively defining axially opposed first and second shoulders when said shaft end is threaded into said mounting sleeve bore;
a thrust collar spacer including a collar segment interposed axially between said first and second shoulders in abutting relation therewith when said shaft end is threaded into said mounting sleeve bore to axially position said compressor wheel relative to said shaft, said thrust collar spacer further including an annular seal flange extending axially in generally concentric spaced relation about said mounting sleeve; and at least one seal ring carried about said seal flange.

18. The compressor wheel assembly of claim 17 wherein said shaft includes a generally cylindrical land interposed axially between said threaded end and said second shoulder, said land having a diametric size less than the diametric size of said second shoulder, and wherein said internal bore formed in said mounting sleeve includes a shallow and generally smooth-walled entrance zone leading to an inset threaded section, said entrance zone having a diametric size for relatively close sliding reception of at least a portion of said shaft land when said collar segment is in abutting relation with said first and second shoulders.

* * * * *